Feb. 14, 1967  A. G. KING  3,303,533

HOT PRESSING APPARATUS

Filed Oct. 23, 1963  4 Sheets-Sheet 1

INVENTOR.
ALAN G. KING

BY
*[signature]*
ATTORNEY

Feb. 14, 1967  A. G. KING  3,303,533
HOT PRESSING APPARATUS
Filed Oct. 23, 1963  4 Sheets-Sheet 3

INVENTOR.
ALAN G. KING
BY
ATTORNEY

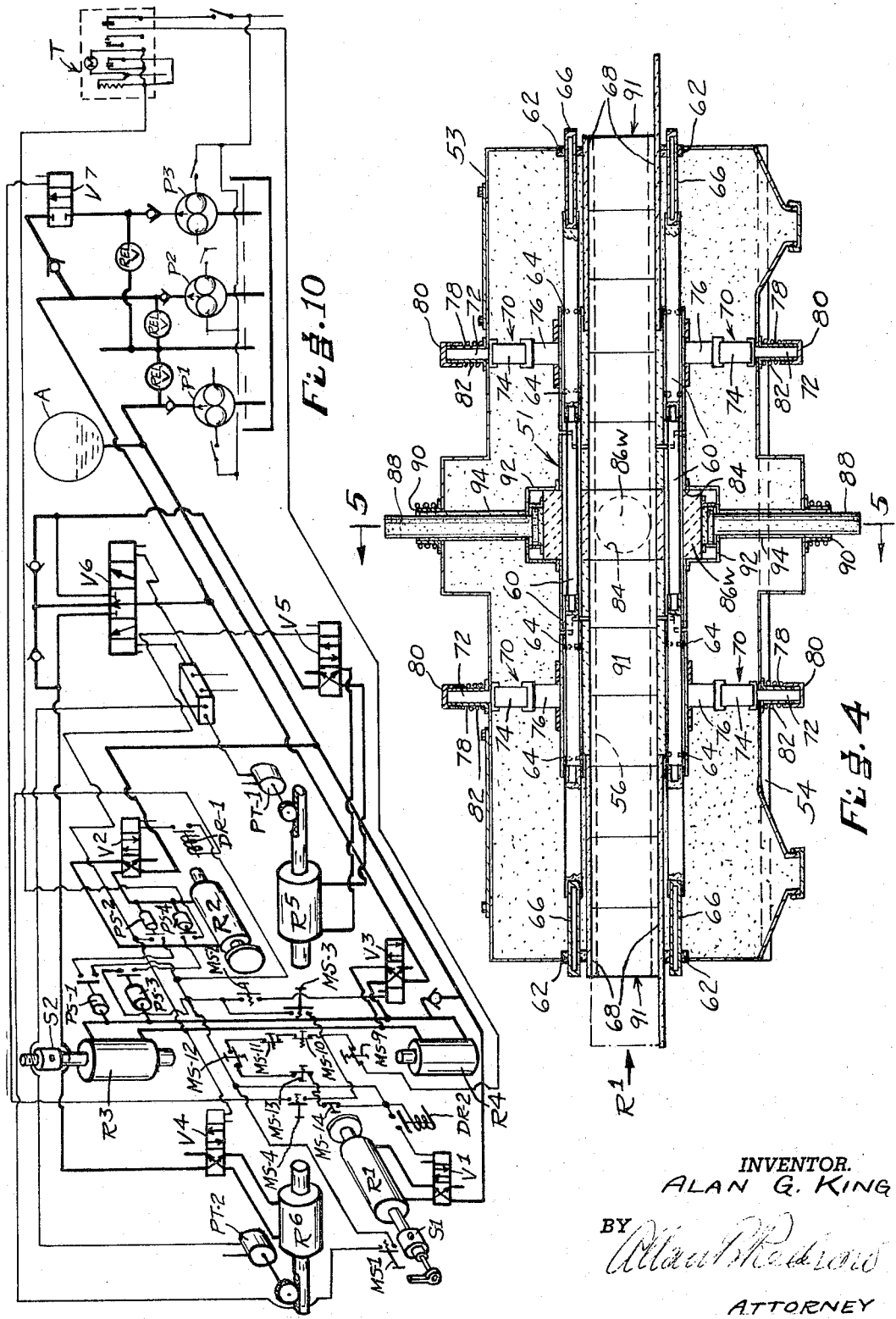

United States Patent Office 3,303,533
Patented Feb. 14, 1967

3,303,533
HOT PRESSING APPARATUS
Alan G. King, West Boylston, Mass., assignor to Norton Company, Worcester, Mass., a corporation of Massachusetts
Filed Oct. 23, 1963, Ser. No. 318,322
11 Claims. (Cl. 18—17)

This invention relates to hot molding of ceramic articles in a wide variety of sizes and shapes which objects may be formed of ceramic or refractory or even powdered metal material.

The principal objects of the invention are to provide a semiautomatic hot press molding apparatus wherein the size and strength of the molds may be reduced materially by employing lateral support for the molds during pressing instead of relying upon the strength of the mold itself thereby to make possible the use of materials compatible with the products being molded; less expensive mold construction; smaller molds; and a smaller furnace and associated apparatus for handling the molds. Other objects are to provide apparatus which may be automated; takes up less space; requires the attendance of only one operator; requires approximately a quarter of the operating time of existing equipment and hence provides a material increase in yield; and which requires little maintenance.

The invention will now be described in greater detail with reference to the accompanying drawings wherein:

FIG. 4 is a vertical, longitudinal section taken through the furnace removed from its supporting frame;

FIG. 6 is an end elevation of a mold assembly;

FIG. 7 is a side elevation of the mold assembly shown in FIG. 6;

FIG. 8 is an end elevation of another kind of mold assembly;

FIG. 9 is a side elevation of the mold assembly shown in FIG. 8; and

FIG. 10 is a diagrammatic view of the pressure-applying means and the controls for effecting their operation in the proper sequence.

The apparatus herein illustrated is for the purpose of hot pressing a compressible material in a mold without requiring that the mold itself be strong enough to withstand the lateral pressure developed against the sides of the mold by application of compacting pressure at the ends of the mold. Briefly, this is accomplished by sliding a mold assembly, consisting of an open-end mold box with plungers inserted in its open ends, into a tunnel-type furnace, with the open ends transverse to the direction of movement, to a zone of high temperature, supporting the four walls of the mold box against deflection transverse to the open ends by means of pressure-applying rams, and applying pressure by other pressure-applying rams through the open ends of the mold box to compact the material therein.

Figure 1:
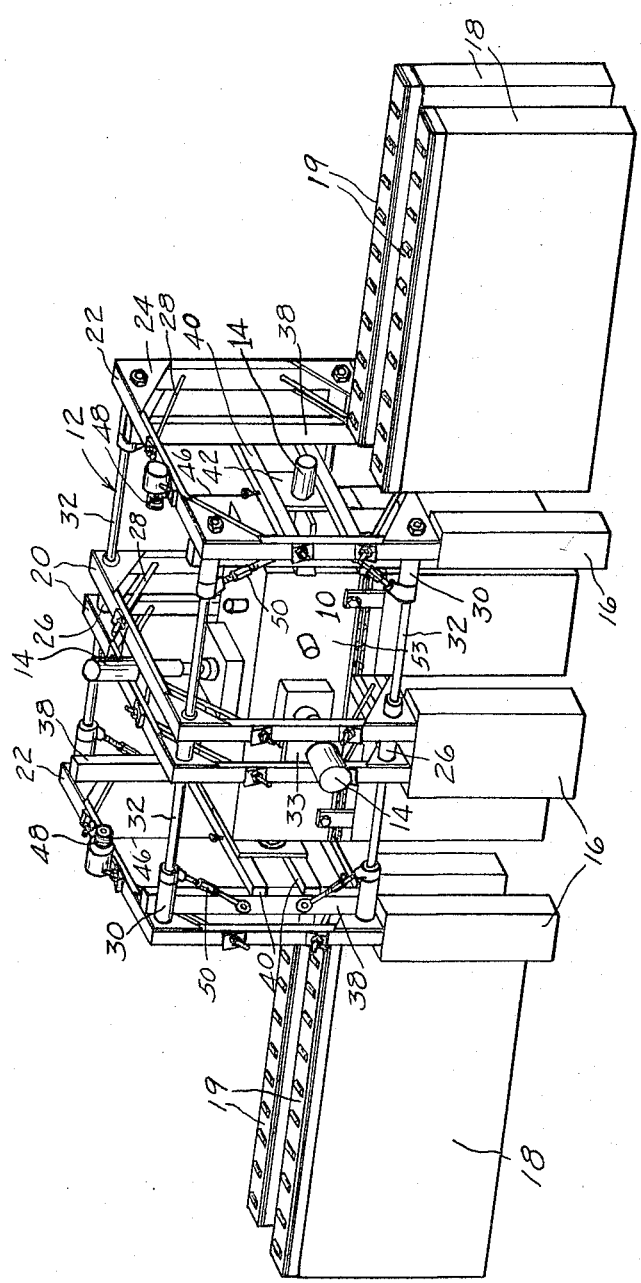
FIG. 1 is a perspective view of the hot pressing apparatus showing a furnace, a supporting frame for the furnace and for pressure-applying means and symmetrically arranged supports designed to permit alternate operation of two furnaces with a single supporting frame.
Figure 2:
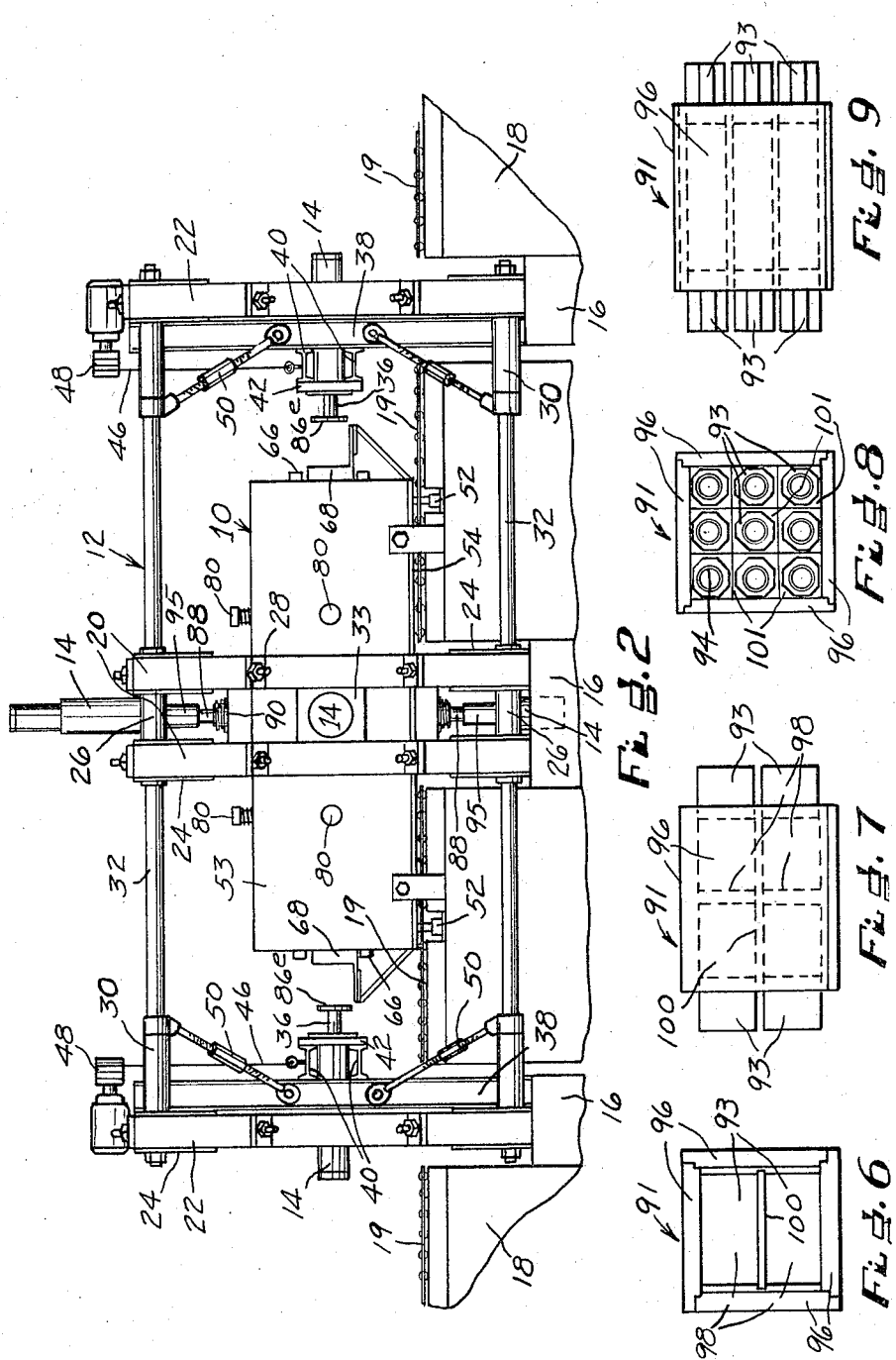
FIG. 2 is an elevation of the apparatus, showing a roller-type track for moving the furnaces into and out of the supporting frames at opposite ends.

Referring to the drawings (FIG. 1), the apparatus comprises a furnace 10, a rigid supporting frame 12 for the furnace, and pressure-applying means in the form of fluid motors 14 arranged at the sides and ends of the furnace. Piers 16 support the frame and piers 18 at the opposite end of the frame, in conjunction with the piers 16, support a roller-type conveyor 19 (FIG. 2), on which two molds are adapted to be moved alternately into and out of the furnace supported on frame 12.

The supporting frame 12 is comprised of intermediate and end members 20—20 and 22—22 comprised of structural steel beams, the beams making up each member being welded together at their corners by means of gusset plates 24. The intermediate members 20—20 are connected in spaced parallel relation by steel tubes 26 welded to the gusset plates and are reinforced against deflection under load by tie rods 28. The end members 22—22 have steel tubes 30 welded to their gusset plates at their corners and are held in spaced parallel relation to the intermediate members by tubes 32 extending through the tubes 26 and 30. The end members 22—22 are further strengthened by detachable tie rods 50 at each of the corners. A plate 33 is welded across the intermediate members 20—20 at each of the four sides for supporting the fluid motors 14 which are in the form of hydraulic cylinders containing rods 36 which project inwardly therefrom at right angles to the sides, there being four such rods. In each end frame 22 (FIG. 1) there are two vertical channel beams 38—38 which bear on the frame at the sides and which, in turn, support vertically spaced, horizontal I beams 40—40 across which is welded a plate 42. The plates 42 support the fluid motors 14 at the end of the furnace with their rods 36 extending inwardly into the open ends of the frame. The horizontal beams 40—40, plates 42 and fluid motors 14 are detachably fastened to the vertical channel beams 38—38 and, when detached, are adapted to be raised to the top of the frame by hoists to permit the furnace to be slid into the supporting frame. Each hoist consists of a cable 46 attached at one end to an eye fixed in the upper one of the horizontal I beams and at its other end to a drum 48 on which it is wound and by means of which it may be taken up or let out.

Figure 3:
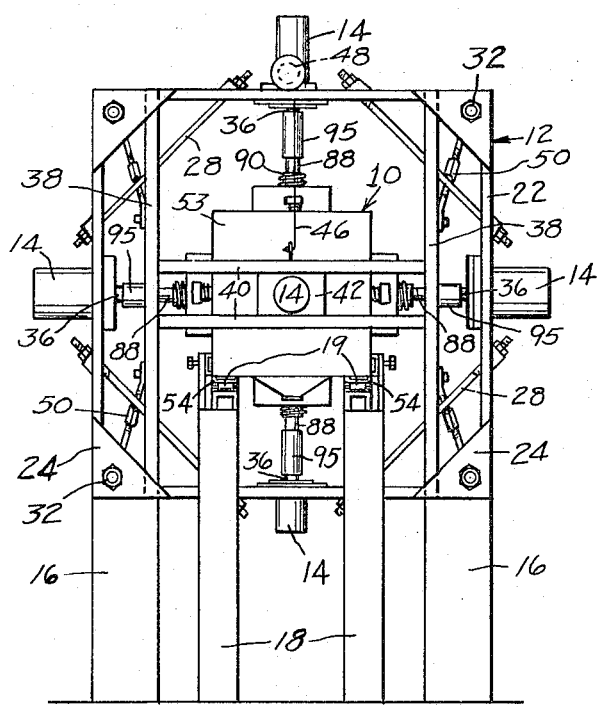
FIG. 3 is an end elevation.

The supporting frame 12 is supported in a horizontal position above the floor on the piers 16 between the piers 18—18 at the ends and as will appear more fully below such structure makes possible the dumping of the insulation from the furnace by moving cars under the frame and then removing suitable plates at the bottom of the furnace shell provided for this purpose. The furnace is slid into the supporting frame on the conveyor 19 and, when brought into alignment with the rods 36 of the motors 14, is supported within the supporting frame by means of screw jacks 52 (FIG. 2) which engage against a pair of channel beams 54—54 (FIGS. 3 and 4), disposed longitudinally of the furnace 10 at the bottom side thereof.

Figure 5:
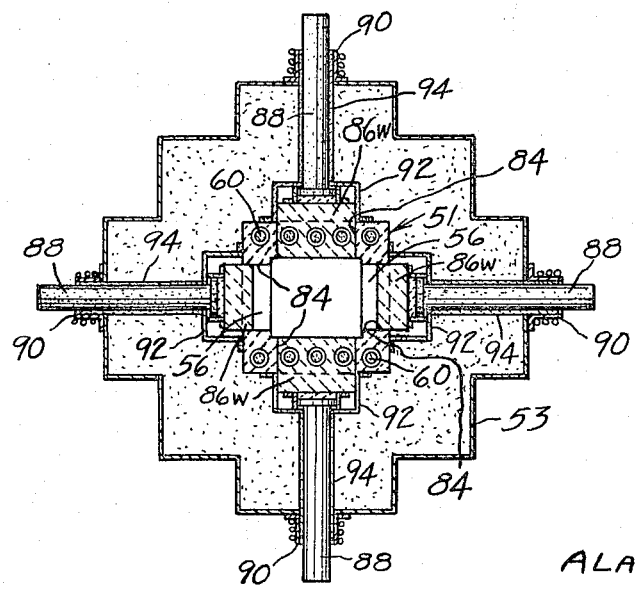
FIG. 5 is a transverse section of the furnace taken on the line 5—5 of FIG. 4.

The furnace comprises an elongate refractory tube 51 (FIGS. 4 and 5), situated within a sheet metal shell 53, which provides an insulating space about the exterior of the furnace tube which is filled with a suitable insulation such as lamp black. Suitable filling openings may be provided at the top of the shell and discharge openings at the bottom of the shell to permit filling and/or removal of the insulation. The furnace tube is made up of blocks of graphite disposed in end-to-end interlocking engagement to form a chamber of substantially rectangular, internal cross-section. In one form the furnace has a total length of 82 inches and an external cross-section of 22" x 22" and an internal cross-section of 12" x 14". The joints between sections are designed to provide space for thermal expansion. The side walls of the tube, internally, have lengthwise thereof substantially rectangular recesses 56 of a size about 3" x 10". As shown in FIG. 5, five longitudinal holes 3" in diameter are drilled through the top and bottom walls of the furnace walls to provide spaces for ten graphite heating rods 60. The holes are drilled larger than the rods and the rods 60 are held out of contact with the furnace walls by ceramic spacers 62—62 at their ends and may if necessary be spaced therefrom in a well known manner by means of a plurality of small pyrolytic graphite pins engaging with the exterior surface of the rods 64, midway between the ends thereof. The heating rods are made in sections which decrease from a maximum resistance at their midsections toward their ends so as to provide progressively decreasing resistance and hence a desired thermal gradient from a maximum temperature at the place of applying pressure in the furnace, to a lower temperature at their ends. The heating rods may be made in sections which are fitted together in a conventional manner either by threading or by slip joints. The outer ends of the heating rods extend through water-cooled copper or aluminum connectors 66—66 situated at the ends of the furnace tube.

Each end of the furnace tube 53 is connected to the external shell 53 by a tube 68 of rectangular, internal cross-section, formed out of one inch graphite plates. These tubes reduce the end heat losses and provide convenient support for moving the molds into and out of the furnace.

The furnace tube 51 is supported within the shell 53 and aligned with the rods of the pressure-applying means by eight cylindrical columns 70, each of which is composed of graphite, insulating zirconia, and steel parts 72, 74 and 76 (FIG. 4). The parts 72 enter the furnace through sleeves 78 and the parts 74 and 76 are situated within the furnace with the parts 76 engaged with the wall of the tube. A cap 80 is threaded on each sleeve 78 and provides means for adjusting the parts. A coil 82 is disposed about each sleeve 78 adjacent the outer wall of the shell through which a cooling medium may be circulated.

Substantially midway between the ends of the furnace tube 51 there are four circular openings 84, one in each wall, in which there is situated a block 86w which is secured to the inner end of a ram 88. The rams 88 extend outwardly from the block through the walls of the furnace tube and the walls of the shell through water-cooled sleeves 90 for engagement through coupling means 95 at their outer ends with the rods 36 of the motors 14 supported by the frame 12.

Graphite shells 92 and tubes 94 enclose the blocks 86w and rams 88 between the outer surface of the furnace tube and the shell 53 which prevent the lamp black thermal insulation from interfering with movement of the moving parts and provide for initial alignment for the rods 36 with the rams 88. The blocks 86w and rams 88 may be comprised of recrystallized silicon carbide. The blocks 86w at the top and bottom provide lateral support for the mold and those at the sides provide for applying pressure for compacting the material contained by the molds. Support for the remaining two sides of the mold is provided through the open ends of the furnace tube by rams comprised of blocks 86e fixed to the ends of the rods 36 of the motors 14, supported at each of the ends of the frame, which have contact with each of the endmost molds of the column of molds situated in and which fill the furnace tube. The rods 36 and blocks 86e which constitute the rams at the ends of the furnace tube, provide, in addition to lateral support, means for moving the column of molds through the furnace tube. The rods 36 may be driven in a suitable sequence to put pressure on the molds in the column and cause to apply pressure to the mold disposed between rams 86w. The rams may also be operated to release the pressure and effect stepwise feeding of the column of molds.

The use of silicon carbide rams rather than graphite reduces lateral heat loss by six (6) fold, due in part to the greater strength of the silicon carbide which makes it possible to employ rods 88 of relatively small cross-section and in part to the fact that the silicon carbide also has a lower thermal heat conductivity than graphite which would otherwise be utilized.

The molds (FIGS. 6 to 9) are hollow open-end boxes 91 of rectangular cross-section, provided at their open ends with plungers 93 movable toward each other to compact the content of the mold. The mold assemblies 91, 93 are slid into the furnace tube with their open ends disposed transversely thereof and with the projecting ends of the plungers 93 situated within the recesses 56—56 in the side walls provided for this purpose. The mold assemblies are moved lengthwise of the furnace tube to bring one after another of the molds into the hot zone into alignment with the wall blocks 86w. The top and bottom wall blocks 86w are now brought into engagement with the mold situated between them to support its top and bottom walls and then the end wall blocks 86e at the opposite ends of the furnace tube are brought into engagement with the endmost molds of the column of molds in the furnace tube to support the side walls of the molds. The mold is thus supported laterally at its four sides at right angles to the direction of the compacting pressure. Compacting pressure is now applied by the wall blocks 86w at the opposite sides. To permit movement of the blocks 86w at the top and bottom sufficiently to apply the pressure required for support, the holes through which the heating rods 60 pass are made somewhat larger than the rods and may even be made elongated in form if necessary, to permit the blocks to move without deflecting the heating rods and/or breaking the same.

There are two forms of mold box assemblies shown in FIGS. 6 to 9 inclusive. The form shown in FIGS. 6 and 7 is made up of four interfitted graphite plates 96, each plate being 12 inches wide, 14 inches long, and 1 inch thick, so that the assembled plates provide an internal opening which is 10" x 10" x 14". The mold in FIGS. 6 and 7 is divided internally into four cells of equal volume by medially disposed partition walls 98 and 100. The mold shown in FIGS. 8 and 9 is made up of graphite plates like those used in the mold shown in FIGS. 6 and 7, but is provided with a plurality of graphite cores 101 which are drilled or broached to provide nine (9) longitudinally disposed cells. The plungers 93, which are disposed in the ends of the molds, are comprised of graphite. If the product or material which is being hot pressed strongly adherent to graphite, thin detachable liners may be employed. The mold walls are not required to withstand the applied pressure since the lateral pressure is taken up by the supports described above. Hence, the walls of the mold may be made much thinner and hence cheaper than heretofore ever thought possible.

Such dimensions as are referred to herein are solely for the purpose of illustration and may be changed whenever expedient for the purpose of making the apparatus larger or smaller. Moreover, although the apparatus as described herein was designed for the purpose of hot molding ceramic material, it is to be understood that it may be used for molding any material which requires a high molding temperature which should be applied to the product while simultaneously subjecting it to a substantial degree of pressure.

It is to be further understood that although graphite is referred to as the refractory material used in the construction of the furnace tube, molds and other certain components of the apparatus, these components may be made of other suitable refractory material such as aluminum oxide, silicon carbide, zirconia, titanium diboride, etc. depending upon the particular application and the product to be produced therein.

Further, the furnace tube may be heated with gas, fuel oil, or electrically fired heating apparatus, the choice of which depends on such factors as the type of atmosphere desired, and the possible contamination of the atmosphere on the product by the combustion gases.

The motion of each ram, the thrust it generates, its sequence of release and retraction and the safety devices therefor are controlled at each step of the operation by microswitches, electronic pressure-sensitive switches and timer controls. Control is effected so that each successive step must be completed before the next step takes place in the cycle of operation.

Referring to FIG. 10, the control means to accomplish these desiderata are shown and the hot pressing process is initiated with a full column of mold assemblies in the furnace the center portion of which has been brought to the temperature required for the particular molding process, with all of the rams retracted. The rams are as above described driven by the motors 14 which may comprise cylinders to which a motivating fluid may be supplied under controlled pressure to advance and retract the rams. To simplify the description of the sequence of automatic operation of the rams they will be referred to by the letters $R^1$ to $R^6$ inclusive. Assuming that power is on, the pumps P1, P2 and P3 started, a column of molds is situated in the furance and the timer T has reset and energized a delay relay DR-2. To commence the operation, a mold assembly is placed in the left-hand end of the furnace tube during the delay period of a delay relay DR-2 and the ram $R^1$ at the left end of the furnace tube is advanced to the right (FIG. 4) and when relay DR-2 times out energizing solenoid valve V1, pressure from the pump P1 advances the mold column one mold assembly length to the right. The length of the infeed stroke is determined by a mechanical stop S-1. This motion trips a microswitch MS-1 which activates a delay relay DR-1. During this delay a mold assembly is removed from the right end of the furance tube. If desired, a mold handling system may be added to push molds into and out of the column. This delay relay DR-1, when it times out, energizes solenoid valve V2 which controls flow of fluid from pump P1 to the cylinder of the motor for ram $R^2$ at the right end of the furnace tube to move it into position so that it bears on the right-hand end of the column of molds. This activates a microswitch MS-2 energizing solenoid valve V3 which supplies a higher pressure from pump P2 to the cylinders of the motors for rams $R^1$ and $R^2$ and to the rams $R^3$ and $R^4$, so as to bring the last two named rams into engagement with the top and bottom sides of the mold positioned in the hot zone of the furnace to thereby provide lateral support for the four sides of the mold perpendicular to the direction in which the compacting pressure is applied during the hot pressing operation. The actual pressures used to provide the required lateral support will be determined by experience. In practice, the pressures exerted by the rams $R^2$ and $R^4$ will be slightly less than the pressures of the rams $R^1$ and $R^3$ which may for this purpose be driven by slightly larger sized pistons than the rams $R^2$ and $R^4$ so that the rams $R^1$ and $R^3$ are held against the stops S-1 and S-2. The hydraulic pressure in the motors of rams $R^1$ and $R^3$ activates two pressure-sensitive switches PS-1 and PS-2 energizing solenoid valves V4 and V5 to supply pressure to the cylinders of the rams $R^5$ and $R^6$ at opposite sides of the mold in the hot zone to thereby apply pressure to the plungers 93 thus to initiate densification while simultaneously applying heat. The rams $R^5$ and $R^6$ are advanced simultaneously and their movement is controlled by potentiometers PT-1 and PT-2 connected thereto by a rack and pinion mechanism. Their output voltages are opposed and are made to regulate opposed solenoids operatively associated with a valve V6 to balance the action of the rams. If the ram $R^5$ advances a distance increment further than the ram $R^6$, the resultant output is positive (+) and the valve closes which supplies pressure to the ram $R^5$. If the ram $R^6$ moves an increment more than the ram $R^5$, the resultant voltage is negative (—) and the valve closes which supplies pressure to the cylinder of the ram $R^6$. The control is set so that both valves are open for a small increment of motion between these two extremes. This system insures that the loading is applied symmetrically to prevent torque in the system. After both rams $R^5$ and $R^6$ have advanced a set distance, microswitches MS-3 and MS-4 are tripped energizing solenoid valve V7 providing increased pressure from pump P3 to rams $R^1$, $R^2$, $R^3$, $R^4$, $R^5$ and $R^6$. This pressure activates two pressure switches PS-3 and PS-4 starting the timer T. The densification process proceeds as before at the higher pressure until the contacts of timer T open releasing the holding circuit to deenergize all of the hydraulic solenoid operated valves, to effect the retraction of all the rams by supplying hydraulic pressure to the opposite ends of all of the ram cylinders so as to withdraw the rams. The delay relays DR-2 and DR-1 are reset again when the timer T resets. This ends the cycle. Six microswitches MS-9 to MS-14 inclusive are wired in series with the timer contact to provide for shutting off the hydraulic pressure if any of the rams advance beyond a given distance. An accumulator A is provided in the pressure system.

The temperature of the furnace can be automatically controlled with a suitable means.

It is desirable to have manual controls that by-pass the automatic control system and to provide audio-visual signals to indicate failure of the automatic control system.

Depending on the nature of the material being hot molded, the apparatus can be cycled in 15 to 30 minutes or for longer or shorter periods. A single operator is all that is required for loading and stripping the mold and/or to take care of any difficulties which may be experienced. This is in marked contrast to existing hot molding equipment which requires about 2 hours for cycling so that the automatic press disclosed herein has the advantage of approximately ten times the capacity of prior apparatus.

This apparatus is well adapted to the automatic performance of any well known hot pressing process such as is well known in the refractory or ceramic arts and powdered metalurgy. Such processing contemplates the application of a relatively high degree of pressure to a confined object while the object is subject to a more or less raised temperature to effect the desired densification and molding of the object. The pressures required to be used and the temperatures of treatment are well known to those skilled in the art and form no part of the present invention.

It should be understood that the present disclosure is for the purpose of illustration only and that this invention includes all modifications and equivalents which fall within the scope of the appended claims.

What is claimed is:

1. Apparatus for intermittently subjecting material in a multi-sided mold to temperatures of sufficient degree and pressure in a range to mold said material by the hot pressing thereof comprising a series of molds having chambers therein to receive the material to be hot pressed, and plungers in the chambers to press against the material, a furnace adapted to serially receive the molds containing the material to be hot pressed, said furnace including a hot zone, means to feed molds filled with said material generally longitudinally through said zone, said molds being moved therethrough with said plungers disposed transversely to said longitudinal direction of movement, means to heat the zone to hot pressing temperatures, opposed means at the heated zone for applying pressure toward all of the sides of the mold with substantially balanced opposed pressures including means to simultaneously create a hot pressing molding pressure against the plungers while the mold is disposed in said zone, and said pressure applying means being activated for a time period to maintain the pressure for a sufficient time period to complete a hot pressing operation and then being released, and means to remove the molds serially from said zone after completion of said hot pressing and molding operation.

2. An apparatus as defined in claim 1 wherein said opposed means for applying pressure are formed of silicon carbide for extending into said zone and engaging the side walls of the mold.

3. Apparatus for hot pressing moldable material comprising a tubular form of furnace open at its ends, providing an elongate heated passage, six-sided molds for said material, each of said molds having internal chambers with open end walls within which are disposed plungers, said molds being adapted to be moved in a column through said tube with the open end walls transverse to the direction of movement, a hot zone intermediate the open ends of the furnace, means at the hot zone for applying pressure against two of the walls of one of said molds from externally of the furnace, means to apply pressure directly to the plungers of said one of the molds in said column situated at the hot zone, means supported within the open ends of the furnace for applying pressure to the endmost molds of the column of molds and hence to apply pressure to the other two sides of said mold situated in the hot zone, and means for effecting operation of said pressure-applying means to apply pressure to the four walls of said mold, to support the same, concomitantly with the application of the pressure to the plungers for compacting the material in said mold.

4. Apparatus of claim 3 for hot pressing moldable material comprising open-end molds having relatively thin walls, said furnace tube being formed of relatively thin walls, and said means for effecting movement of the pressure-applying means also serving to apply lateral support to the walls of said one mold to support the mold independently of the walls of the furnace and to apply compacting pressure to the plungers.

5. Apparatus of claim 3 for hot pressing moldable material comprising means associated with said means supported in the open ends of the furnace for moving the molds to bring their open ends, one after another, into alignment with the pressure-applying means, means for effecting sequential operation of said pressure-applying means to compact the material within the mold in the hot zone.

6. Apparatus of claim 3 for hot pressing moldable material wherein said pressure applying means at the hot zone includes a plurality of rams supported for movement through openings in the side walls of the furnace into engagement with the mold at the hot zone for supporting two of its side walls and applying the compacting pressure to the plungers in the open ends of said mold, and said means also includes other rams supported for movement through the open ends of the furnace into engagement with the endmost molds of said column to support the other two side walls of said mold at the hot zone through the medium of the molds preceding and following said one mold.

7. Apparatus for hot pressing moldable material comprising a furnace having walls forming a tube having open ends, a plurality of molds for said material, each of said molds having open ends within which plungers are disposed, said molds being adapted to be moved in a column through said tube with their open ends disposed transversely of the direction of movement, said walls of the furnace intermediate their ends containing quadrilaterally disposed openings, rams disposed in the openings in the walls operable, from exteriorly of the furnace tube, to move inwardly relative to the walls of the tube, a first pair of rams operable to apply compacting pressure to the plungers in the open ends of the mold situated between said first pair of rams, a second pair of rams operable to provide lateral support for two of the walls of said mold disposed therebetween in a direction perpendicular to the direction of applied compacting pressure, a third pair of rams supported within the open ends of the furnace in engagement with the endmost molds of the column of molds in the furnace operable to provide lateral support for the other two walls of said mold to which the compacting pressure is applied, said last mentioned pressure being transmitted to said mold through the molds preceding and following said mold, heating elements situated longitudinally of the furnace walls within two of the walls, said heating elements extending continuously through the portions of one of said pairs of rams situated in the openings in said heated walls, said one pair of rams containing elongate openings permitting movement thereof relative to the heating elements without displacement or breaking of the heating elements, and means for supplying operating pressure to all of the rams.

8. Apparatus according to claim 7, wherein the cross-sections of the heating rods decrease symmetrically with respect to their midsections to provide a heat gradient which has its maximum at the midsection.

9. Apparatus for hot pressing articles of ceramic composition comprising means for supporting a column of open-end molds, said open ends each having plungers situated within the open ends for compacting movement within the open ends transverse to the direction of movement of the molds, rams supported for movement toward and away from the top, bottom and side walls, said rams movable toward the side walls being adapted to engage the plungers at the ends of the molds, means including rams supported for engagement with the endmost molds of the column, and control means for effecting operation of the rams in sequence to bring the rams at the ends of the column into engagement with the endmost molds, thereafter to bring the rams at the top and bottom sides into engagement with the top and bottom sides of the mold, and finally to bring the rams at the lateral sides into engagement with the plungers at the ends of the molds to apply compacting pressure.

10. Apparatus according to claim 9, wherein the control means operates to apply pressure to the rams at the entrance end of the furnace tube to push the column of molds lengthwise of the furnace the length of one mold, a limit stop operable by movement of the ram said distance equal to the length of one mold to stop the ram and effect movement of the ram at the opposite end of the furnace tube into engagement with the endmost mold at the exit end, and means operable, by the movement of the last-named ram, to apply pressure to the rams to move the rams at the top and bottom into engagement with the top and bottom sides of the mold and to move the rams at the sides into engagement with the plungers at the ends of the molds.

11. Apparatus according to claim 9, wherein the control means comprises means for supplying pressure to the ram at the entrance end of the furnace tube to push the column of molds through the furnace the length of one mold so that one mold at the exit end is discharged, a limit stop operable by movement of said ram to stop it and move the ram at the exit end up to the endmost mold in the tube, means operable by the ram at the exit end to supply pressure to the rams at the top and bottom walls of one of the molds intermediate the ends of the column and to apply pressure to the rams engaging the plungers, means operable by the rams applying pressure to the plungers to increase the pressure supplied to the rams providing lateral support for the sides, and means operable by the increased pressure to the rams providing lateral support to increase the pressure to the rams for applying compacting pressure and for starting a timer, and means operable by the timer following a predetermined interval to terminate the pressure on the rams.

(References on following page)

References Cited by the Examiner

UNITED STATES PATENTS

| | | |
|---|---|---|
| 1,677,200 | 7/1928 | Oakley. |
| 2,022,528 | 11/1935 | Taylor _____ 18—16.5 X |
| 2,169,281 | 8/1939 | Pfanstiehl. |
| 2,437,127 | 3/1948 | Richarson _____ 18—16.5 X |
| 2,645,060 | 7/1953 | Waggoner _____ 264—332 |
| 2,717,225 | 9/1955 | Williams. |
| 2,941,241 | 6/1960 | Strong _____ 18—16.5 |
| 2,941,243 | 6/1960 | Bundy _____ 18—16.5 |
| 3,098,699 | 7/1963 | Roy _____ 264—332 |
| 3,169,273 | 2/1965 | Brayman. |
| 3,258,514 | 6/1966 | Roach _____ 18—16 X |

J. SPENCER OVERHOLSER, *Primary Examiner.*

ROBERT F. WHITE, *Examiner.*

J. HOWARD FLINT, Jr., J. A. FINLAYSON, Jr.,
*Assistant Examiners.*